United States Patent [19]

Johnson et al.

[11] 3,808,068

[45] Apr. 30, 1974

[54] DIFFERENTIAL ETCHING OF GARNET MATERIALS

[75] Inventors: William Arthur Johnson, Fanwood; James Clayton North; Raymond Wolfe, both of New Providence, all of N.J.

[73] Assignee: Bell Telephone Laboratories, Incorporated, Murray Hill, Berkeley Heights, N.J.

[22] Filed: Dec. 11, 1972

[21] Appl. No.: 313,874

[52] U.S. Cl. .................................... 156/8, 156/17
[51] Int. Cl. ........................ C23b 3/04, C23f 1/02
[58] Field of Search ........................ 156/2, 7, 8, 17

[56] References Cited

UNITED STATES PATENTS

| | | | |
|---|---|---|---|
| 2,989,385 | 6/1961 | Gianola et al. | 41/42 |
| 3,041,226 | 6/1962 | Pennington | 156/17 |

*Primary Examiner*—William A. Powell
*Assistant Examiner*—Brian J. Leitten
*Attorney, Agent, or Firm*—L. H. Birnbaum

[57] ABSTRACT

A method for etching selected areas of single crystal garnets. The crystal is subjected to an ion implantation in the area to be etched. A proper etching solution is then applied to the crystal. The damaged area formed by the ion implantation will etch at a significantly greater rate than the remainder of the material. The process is self-limiting since the depth to which the crystal is etched is dependent upon the depth of the implantation and not upon the etching temperature or the length of time the etchant is applied. The differential etching rate also eliminates undesirable undercutting which usually results from the use of masked chemical etching techniques. The process may be used to form a wide variety of structures in garnet material for application in magnetic domain devices and integrated optics components.

14 Claims, 11 Drawing Figures

DIFFERENTIAL ETCHING OF GARNET MATERIALS

BACKGROUND OF THE INVENTION

This invention relates to the treatment of single crystal rare earth or yttrium garnets for device applications and in particular to a method for etching selected areas of the crystal.

Garnets are a class of material which are fast gaining significance in modern technology. In the context of this application, the material basically comprises ($A_3 B_5 O_{12}$) where A is a rare earth element, yytrium, bismuth or mixtures thereof, and B is Fe, Al, Ga, Sc or any mixture thereof. Garnet material wherein B is Fe is particularly suited for use in the class of devices known as magnetic domain or "bubble" devices, which require a material of high uniaxial magnetic anisotropy and weak magnetic moment for the creation and propagation of magnetic domains of sufficiently small dimensions and wall coercivity. Of particular interest is the epitaxially grown garnet film which has a high packing density of magnetic domains.

While there are many design alternatives for the propagation of domains in these devices, one of the more promising possibilities is the device which defines the propagation path by the formation of grooves in the material under which the domains will be confined. With the grooves acting as rails, propagation of the magnetic domains is achieved by a conductive pattern overlying the surface of the garnet intersecting the grooved areas at strategic locations. The potential of such a device has raised the problem of the proper etching technique for the formation of the grooves. One prior art method is the application of the chemical etching solution to the surface through windows defined by an etch resistant mask. The major problem associated with this technique is that since the crystal etches as fast in the lateral dimensions as in the thickness dimensions, severe undercutting results and resolution of the etched pattern is impaired. Furthermore, the final depth of the etched region is difficult to control since the etch rate is dependent upon the etching temperature, etchant composition, and the length of etching time. One alternative method which avoids the undercutting problem involves removing the material to be etched by ion milling. This process, however, must be carried out over long periods of time, usually in the range of 12–24 hours. Also, the final depth of the ion milled region is difficult to control since it depends on the time of treatment.

It is therefore the primary object of the invention to provide an etching technique for garnet material which permits accurate control over the depth and width of the etched area and may be carried out over short periods of time.

SUMMARY OF THE INVENTION

This and other objects are achieved in accordance with the invention which involves first implanting ion impurities in the area of the crystal to be etched to form a damaged region in the crystal at a depth approximately equal to the desired depth of the etch. A standard etching solution is then applied to the surface. The damaged portion will etch at a significantly greater rate than the rest of the crystal. The process is self-limiting since once the entire region of damage is removed, the entire crystal etches at a uniform rate. Whether or not a mask remains on the surface during etching, the large differential in the etch rate in the lateral and depth dimensions eliminates undercutting and permits precise resolution of the etched pattern.

BRIEF DESCRIPTION OF THE DRAWING

These and other features of the invention will be delineated in detail in the description to follow. In the drawing.

DETAILED DESCRIPTION OF THE INVENTION

The basic steps of the invention in one embodiment are illustrated in FIGS. 1A–1D. The structure shown is suitable for use in magnetic domain devices, although it should be clear that the present invention is not limited to the fabrication of this particular class of devices. Upon a substrate, 10, typically comprising a nonmagnetic garnet such as $Gd_3 Ga_5 O_{12}$, there is epitaxially grown a thin layer of a garnet crystal, 11, approximately 6$\mu$ in thickness. As discussed above, the garnet to which the invention is directed comprises ($A_3 B_5 O_{12}$) where A is a rare earth element, yttrium, bismuth or any mixture thereof, and B is Fe, Ga, Al, In or Sc or mixtures thereof, and O is oxygen. One particularly useful garnet for the layer 11 is $Y_1 Gd_1 Tm_1 Fe_{4.2} Ga_{0.8} O_{12}$. It should be clear that the present method is applicable to all garnets of the formula described. Formed on the garnet layer is a mask, 12, with a window, 13, formed therein which exposes the surface of the crystal in the area to be etched. The mask may be a photoresist material of approximately 1.5$\mu$ thickness with the window formed by standard photolithographic techniques which are well known in the art. Alternatively, the layer 12 may be a metal mask or even a combination of photoresist and metal mask. The important criterion is that the mask is capable of stopping the penetration of the ion beam into the crystal. The mask material and thickness will therefore depend upon the energy and ion species of the implantation. The selection of the proper mask parameters is well within the skill of those knowledgeable in the art and is therefore not discussed except in the detailed examples given below.

Figure 1A:
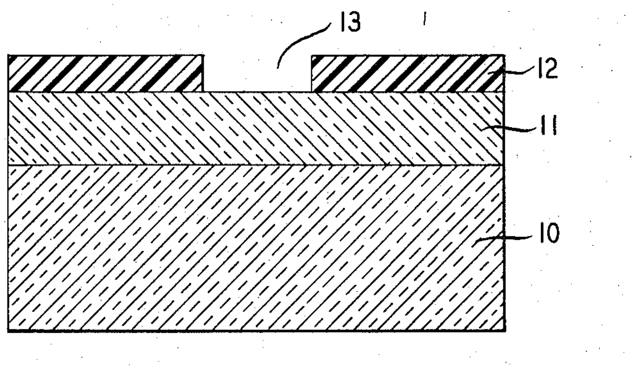
FIGS. 1A–1D are cross-sectional views of a device in various stages of manufacture in accordance with one embodiment of the invention.
Figure 1B:
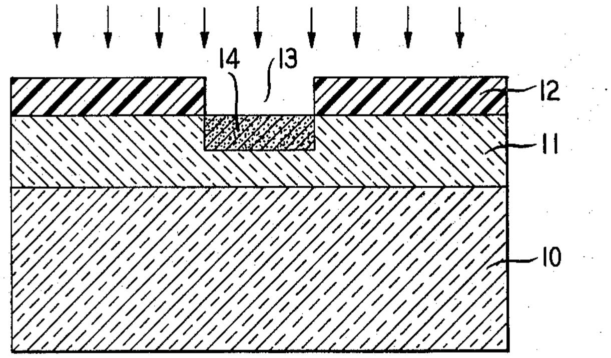

As illustrated in FIG. 1B, the structure is then irradiated with an ion beam of impurities in order to form a region of damage, 14, in the garnet crystal in the area defined by the mask window. The depth of this damaged region is chosen to correspond to the depth of the etched area desired. In forming the grooves in a bubble device, this depth is approximately 0.5$\mu$. This depth is precisely controlled by choosing the proper beam energy and dose for the particular ion species employed. It will also be noted that the lateral dimension of the damaged region is accurately controlled by the dimension of the mask window.

Figure 1C:
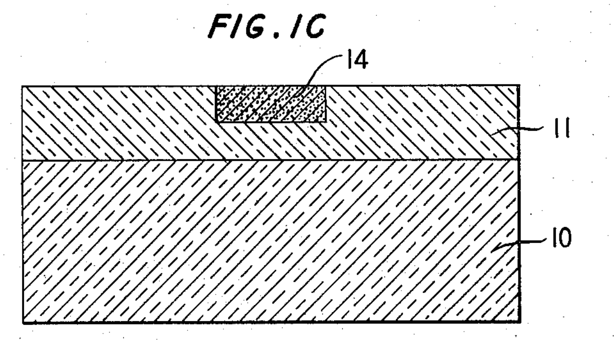
Figure 1D:
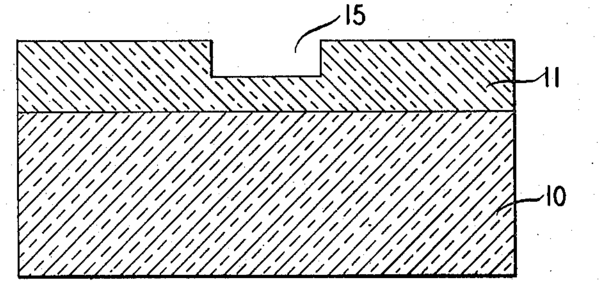

The mask 12 is then stripped off the surface as illustrated in FIG. 1C. This may be accomplished by any of the means known in the art, for example, plasma dry stripping. In the final step, a solution capable of etching the garnet is applied to the surface. Preferably an $H_3PO_4$ solution is used since this solution provides a fast etching rate. Concentrated HCl is also a useful alternative, but many other etchants are possible. As illustrated in FIG. 1D, the damaged region caused by the ion implant has etched at a greater rate than the rest of the garnet crystal giving the desired groove, 15, with lateral and depth dimensions substantially equal to the dimensions of the damaged region. The process is self-limiting since once all the damaged region is etched away, the entire surface etches uniformly. The process is therefore independent of the etching temperature and time and etchant composition as long as sufficient time is allowed to etch away all of the damaged material.

The rate at which the damaged region will etch is a function of the ion species employed and the damage concentration in the garnet. The latter value, in turn, will be a function of distance from the surface since as known in the art the implanted impurity profile essentially follows a Guassian distribution. The type of impurity used and the dose employed may therefore vary considerably depending upon the application. The important criterion, however, is that there is a sufficient differential in the etch rate between the damaged region and the rest of the crystal to insure proper definition of the etched area. A minimum etch rate enhancement factor (the ratio of etch rates in the damaged and undamaged portions of the crystal) of 2 to 1 at the depth of maximum damage concentration is therefore mandated and the choice of proper materials and process parameters should be chosen in accordance with this requirement. In most practical applications, a minimum etch rate enhancement factor of 5 to 1 is desired at the depth of maximum damage concentration. The etch rate enhancement factor will be independent of the etching solution applied. The following illustrative embodiments of the invention are presented primarily as a guide to the skilled artisan. It should be clear, however, that many other examples may be devised.

The following treatments were all performed on the device structure illustrated in FIGS. 1A–1D. The epitaxial layer, for example, 1, 2, and 3 was $Y_1 Gd_1 Tm_1 Fe_{4.2} Ga_{0.8} O_{12}$. A photoresist layer of approximately 1.5$\mu$ thickness was used as the mask and $H_3PO_4$ was employed as the etching solution.

Example 1

Figure 2:
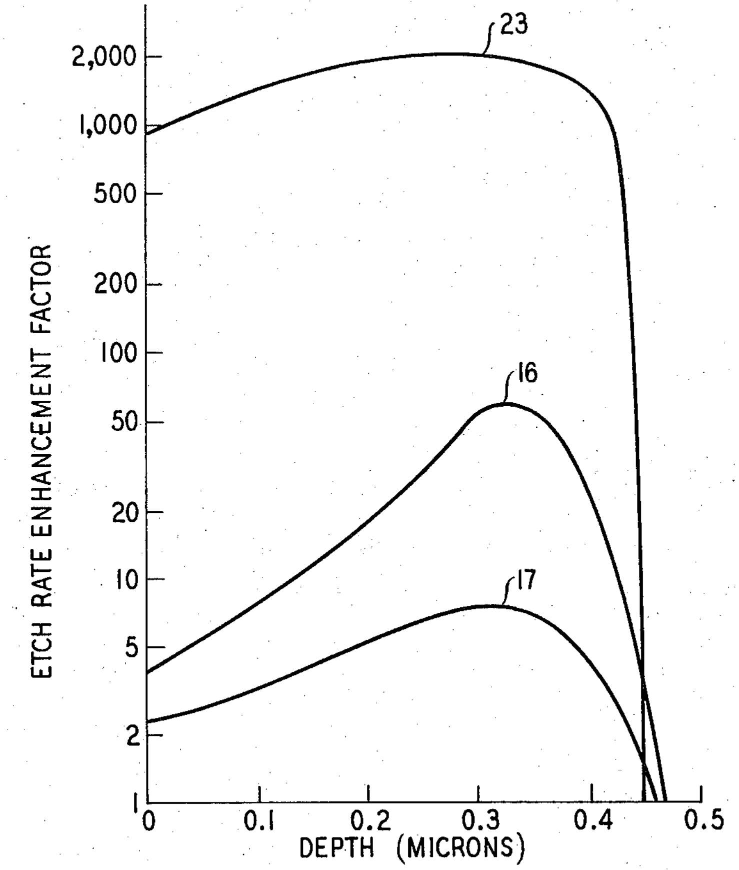
FIG. 2 is a graph of the etch rate enhancement as a function of depth in the crystal in accordance with three alternative embodiments of the present invention.

Neon ions were implanted into the crystal at an energy of approximately 300 KeV and a dosage of approximately $1 \times 10^{16}$ ions/cm$^2$. The depth of the damaged region was approximately 0.45$\mu$. After removal of the mask by plasma stripping, the etching solution of density 1.87 gms/c.c. was applied to the surface at a temperature of about 160° C. The damaged region was completely removed after only about 0.2 sec. The etch rate enhancement factor was measured and this factor as a function of depth is illustrated as curve 23 in the graph of FIG. 2. The etch rate enhancement factor is an almost incredible 1,000 to 1 at the surface and 2,000 to 1 at a distance of about 0.2 - 0.4$\mu$ from the surface. This extraordinary etch rate differential clearly makes the neon implantation a most desirable alternative. To achieve a minimum etch rate enhancement factor of 2 to 1, a dosage of at least $4 \times 10^{13}$ is required. To achieve a minimum etch rate enhancement factor of 5 to 1 for neon, a dosage of at least $10^{14}$ ions/cm$^2$ is needed.

Example 2

The same basic procedure as in example 1 was followed. Here, however, helium ions were implanted at an energy of 100 KeV and the same dosage of $1 \times 10^{16}$ ions/cm$^2$. The depth was again approximately 0.45$\mu$. In this example, the time for removal of the damaged region was about 20 sec. The etch rate enhancement factor, as shown by curve 16 of FIG. 2 varied from approximately 5 to 1 at the surface to approximately 50 to 1 at about 3$\mu$ from the surface. To maintain a minimum etch rate enhancement factor of 2 to 1, a dosage of helium ions of at least $1.6 \times 10^{15}$ is called for, while a factor of 5 to 1 requires a dose of at least $4 \times 10^{15}$ ions/cm$^2$.

Example 3

The same as examples 2 and 3 with hydrogen ions implanted at an energy of 100 KeV and a dosage of $4 \times 10^{16}$ ions/cm$^2$. Etching time was 100 sec. at 160° C. The etch rate enhancement factor as shown by curve 17 in FIG. 2 was 3 to 1 at the surface and a maximum of 5 to 1 at 0.3 - 0.4$\mu$ below the surface. A minimum dosage for hydrogen ions is $1.6 \times 10^{16}$ ions/cm$^2$ in order to obtain an etch rate enhancement factor of 2 to 1 at maximum concentration and $4 \times 10^{16}$ for an etch rate enhancement factor of 5 to 1 at the maximum concentration.

Example 4

The identical procedure as described in example 1 was followed with $Gd_3 Ga_5 O_{12}$ as the garnet material being etched. Results identical to those given in example 1 were obtained.

Further experimental evidence has verified the fact that the etch rate enhancement factor is independent of etching temperature and etchant composition for all ion species.

Figure 3A:
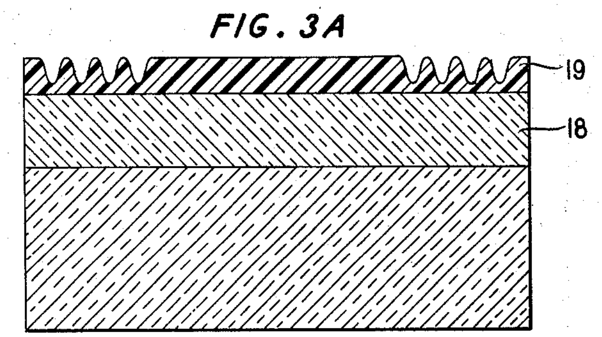
FIGS. 3A–3F are cross-sectional views of a device in various stages of manufacture in accordance with a further embodiment of the invention.

Of course, the invention is not limited to the fabrication of magnetic domain devices, but may be utilized to form etched patterns wherever rare earth garnets are used. For example, FIG. 3A shows a thin film laser employing a $Y_3 Al_5 O_{12}$ epitaxial layer, 18, as the active medium. Since it is difficult to form mirror surfaces on the edge of such a thin layer (usually of the order of 1$\mu$ in thickness), one method of achieving internal reflection for lasing is to form a diffraction grating at the surface of the garnet. The grooves in the grating must be extremely close together, i.e., a distance of $\lambda/2$ apart, where $\lambda$ is the wavelength of the light emission. Extremely good resolution is therefore required and this may be achieved by utilizing the present inventive method. As a first step, a layer of photoresist, 19, is formed on the garnet material with a series of depressions on both ends as shown. The development of the photoresist in such a pattern may be done by a number of methods known in the art and consequently a detailed discussion of this step is omitted. Also, if the photoresist is sufficiently developed, it is possible to form the pattern with no photoresist at all in the depressed areas leaving the crystal exposed in these areas. However, in this example some residual photoresist is present.

Figure 3B:
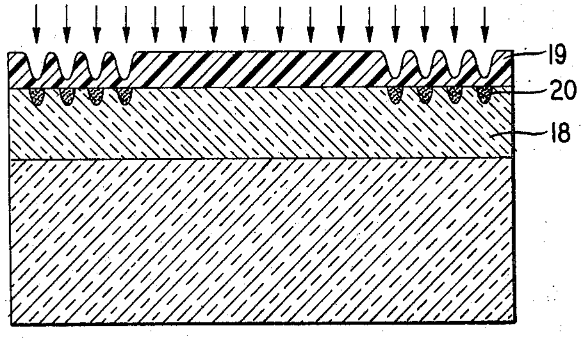

The device is then subject to irradiation by an ion beam of impurities as illustrated in FIG. 3B to form damaged regions 20 beneath the depressions in the photoresist. In this example, neon was used as the ion species at a dose of $10^{15}$ ions/cm$^2$ and an energy of 50 KeV. The thickness of the photoresist in the depressions was approximately 200A to permit penetration of the ions to the crystal in those areas, while a thickness of about 1,500A in the remainder of the photoresist blocked penetration of ions into the remaining area of the crystal. Of course, the thickness of photoresist required for other ion species, doses, and energies will vary, but may easily be determined by those skilled in the art. In this example, the depth of the damaged region is approximately 500A.

Figure 3C:
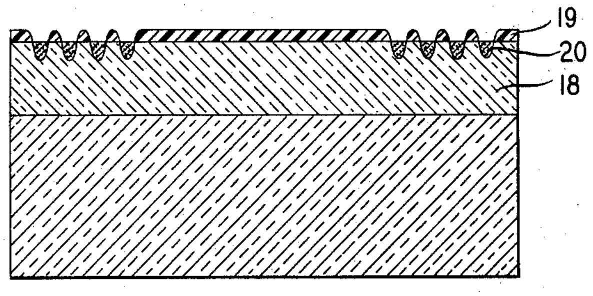
Figure 3D:
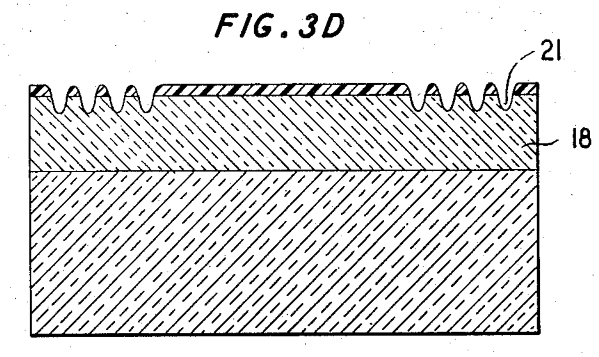
Figure 3E:
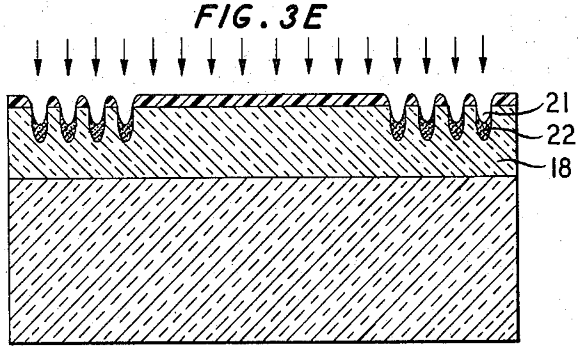

The photoresist may then be stripped off as before, and an etching solution such as $H_3PO_4$ applied to the surface to etch out the implanted areas and form the grating pattern. However, if it is desired to form deeper grooves than is possible within the limits of photoresist thickness and ion energy, the following sequence of steps illustrated in FIGS. 3C–3F may be employed. In FIG. 3C, only the thin portions of photoresist are removed so that the crystal is exposed in the areas of the damaged regions. This can be accomplished by plasma dry stripping or ion milling techniques which remove the photoresist uniformly, and stopping the process once the thin portions are removed, leaving the thicker portions on the surface. Then, as shown in FIG. 3D, the damaged regions are etched away by applying a suitable etchant such as $H_3PO_4$ to form grooves 21. Since the etch rate of the damaged regions as compared to the undamaged regions is approximately 200 to 1 in this example, no significant undercutting is observed and close tolerance requirements are met.

In the next step, as illustrated in FIG. 3E, the device is again subject to an ion beam of impurities to form the damaged regions 22 beneath the grooves, which are unprotected by the photoresist. Again, the ions may be neon at a dose of $10^{15}$ ions/cm$^2$. The energy should be reduced, however, since the photoresist layer has been reduced in thickness over the previous implantation. In this particular example, the energy may be approximately 40 KeV with a photoresist layer thickness of about 1,200A to produce the damaged regions at a depth of 400A as measured from the surface of the grooves.

Figure 3F:
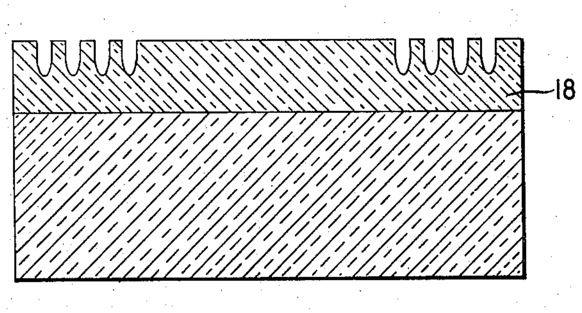

After the remaining photoresist is stripped away, an etching solution such as $H_3PO_4$ is again applied to the surface to etch away the damaged regions 22 to leave the deeper grooves (approximately 900A) of the diffraction grating as shown in FIG. 3F.

It should be mentioned at this point that the etch rate enhancement factor possible with neon and other heavy ions is one of the unique and surprising features of the invention. The fact that etch rate enhancement factors of 200 to 1 or greater are possible with this process should therefore be appreciated as a radical development in this technology.

Various additional modifications and extensions of the invention will become apparent to those skilled in the art. All such deviations which basically rely on the teachings through which the invention has advanced the art are properly considered within the spirit and scope of the present invention.

What is claimed is:

1. A method for etching a selected area of a crystal comprising $A_3B_5O_{12}$, wherein A is selected from the group consisting of the rare earth elements, yttrium, bismuth, and mixtures thereof, and B is selected from the group consisting of Fe, Al, Ga, In, Sc, and mixtures thereof, comprising:

irradiating the surface of the crystal with an ion beam so as to form a region of damage confined to the area of the crystal to be etched; and applying an etching solution to the surface of the crystal which will etch the region of damage at a faster rate than the remaining area of the crystal.

2. The method according to claim 1 wherein the dose of the ion beam is chosen so that the etching rate of the crystal at the depth of maximum damage concentration in the damaged region is at least two times greater than the etching rate of the crystal outside the damaged region.

3. The method according to claim 1 wherein the dose of the ion beam is chosen so that the etching rate of the crystal at the depth of maximum damage concentration in the damaged region is at least five times greater than the etching rate of the crystal outside the damaged region.

4. The method according to claim 1 wherein the etching solution is $H_3PO_4$.

5. The method according to claim 1 wherein the ion beam comprises neon ions.

6. The method according to claim 5 wherein the dose of the ion beam is at least $10^{14}$ ions/cm$^2$.

7. The method according to claim 1 wherein the ion beam comprises helium ions.

8. The method according to claim 7 wherein the dose of the ion beam is at least $4 \times 10^{15}$ ions/cm$^2$.

9. The method according to claim 1 wherein the ion beam comprises hydrogen ions.

10. The method according to claim 9 wherein the dose of the ion beam is at least $4 \times 10^{16}$ ions/cm$^2$.

11. The method according to claim 1 wherein the crystal comprises:

$Y_1 Gd_1 Tm_1 Fe_{4.2} Ga_{0.8} O_{12}$.

12. The method according to claim 1 wherein the crystal comprises:

$Y_3 Al_5 O_{12}$.

13. The method according to claim 1 further comprising the steps of irradiating the surface of the crystal with a second ion beam so as to form a region of damage confined to the area of the crystal beneath the etched area and applying an etching solution to the surface of the crystal which will etch the region of damage at a faster rate than the remaining area of the crystal.

14. The method according to claim 1 wherein the dose of the ion beam is chosen so that the etching rate of the crystal at the depth of maximum damage concentration in the damaged region is at least two hundred times greater than the etching rate of the crystal outside the damaged region.

* * * * *